United States Patent [19]

Anderson et al.

[11] 4,195,522
[45] Apr. 1, 1980

[54] FLOWMETER

[75] Inventors: Kenneth W. Anderson, Fremont, Calif.; Brent Summerhays, Logan, Utah; Verl O. Cazier, Lander, Wyo.

[73] Assignee: Electronic Systems Engineering, Inc., Logan, Utah

[21] Appl. No.: 947,679

[22] Filed: Oct. 2, 1978

[51] Int. Cl.² ............................................... G01F 1/06
[52] U.S. Cl. ....................................................... 73/229
[58] Field of Search ................ 73/229, 231 R, 194 E; 416/197, DIG. 3; 222/14, 36, 59, 71; 113/116 D; 29/156.8 R; 324/175

[56] References Cited

U.S. PATENT DOCUMENTS

| | | | |
|---|---|---|---|
| 2,037,278 | 4/1936 | Siber | 73/229 |
| 2,623,389 | 12/1952 | Oosterom | 73/231 R |
| 3,721,123 | 3/1973 | Heim | 324/175 X |
| 3,792,610 | 2/1974 | Kountanis et al. | 73/229 |

FOREIGN PATENT DOCUMENTS 1297805  5/1962  France ............................. 416/DIG. 3

*Primary Examiner*—Herbert Goldstein
*Attorney, Agent, or Firm*—J. Winslow Young; H. Ross Workman; Rick D. Nydegger

[57] ABSTRACT

A flowmeter apparatus and method for use in measuring the quantity of liquid beverage passing through a tubing, the apparatus including a flowmeter wheel adapted to be turned by the flow of beverage through the tubing. The flowmeter wheel is interposed in a light path between a light source and a light detector with a plurality of apertures in the flowmeter wheel permitting light passage through the light path to the light detector. Rotation of the wheel creates a series of light pulses that are detected by the light detector and are electronically counted to thereby provide an indication of the amount of beverage passing through the flowmeter and, correspondingly, the tubing.

8 Claims, 5 Drawing Figures

FLOWMETER

BACKGROUND

1. Field of the Invention

The present invention relates to a flowmeter and, more particularly, to a flowmeter apparatus and method for precisely measuring the quantity of beverage passing through a relatively small diameter tubing.

2. The Prior Art

Historically, establishments which dispense beverages experience considerable difficulty in obtaining precise inventory control. For example, establishments such as taverns, and the like, that dispense beverages such as draft beer through a tap experience substantial loss of profits resulting from the common practice of employees dispensing beverages for themselves, friends, acquaintances and other non-paying customers without appropriately recording the transaction in the usual manner. Other establishments which provide beverages from bulk systems experience similar problems. When the bulk container is empty, it has been found that the recordation of cash receipts has not accurately reflected the volume of beverage dispensed particularly over an extended period of time.

Until the present invention, the only technique by which establishment owners have been able to estimate the volume of beverage dispensed from a container has been to grossly measure or estimate the quantity of beverage remaining in the container. Various measurement techniques are known and are generally inaccurate in view of the relatively large volume of the bulk container as compared to the relatively small volume in each quantity of beverage dispensed. In addition, gross measurement techniques do not adequately reflect the volume of business conducted over a predetermined time period and also does not lend itself well to the frequent monitoring of beverage dispensed.

That the need to monitor beverages or other liquids dispensed for purposes of inventory and control is demonstrated by U.S. Pat. Nos. 628,312; 1,222,502; 2,721,702; and 3,467,279.

In view of the foregoing, it would, therefore, be a significant advancement in the art to provide a flowmeter apparatus and method for accurately measuring the volume of beverage dispensed through a small tubing. Such an apparatus and method is disclosed and claimed herein.

BRIEF SUMMARY AND OBJECTS OF THE INVENTION

The present invention relates to a novel flowmeter apparatus and method for use in accurately measuring the volume of beverage dispensed through a relatively small tubing. A flowmeter wheel extends into a continuum of the tubing and has a plurality of beverage engagement members thereon to cause the flow of beverage to turn the flowmeter wheel. The flowmeter wheel is interposed across a light path between a light source and a light detector while a plurality of apertures in the flowmeter wheel permit the light to pass through the flowmeter wheel as a series of light pulses. The rapidity of the light pulses is directly proportional to the speed of rotation of the flowmeter wheel and, therefore, the beverage flow rate through the tubing. The light pulses are electronically counted as a function of time to provide an accurate indication of the beverage flow rate.

It is, therefore, a primary object of this invention to provide improvements in flowmeters.

Another object of this invention is to provide improvements in the method of measuring beverage flow through a tubing.

Another object of this invention is to provide a flowmeter which can be interposed in a tubing carrying a beverage to thereby provide an accurate indication of the quantity of beverage flow through the tubing.

Another object of this invention is to provide a flowmeter wherein a flowmeter wheel is turned by flow of beverage through the flowmeter, the flowmeter wheel being interposed in a light path with a plurality of apertures in the flowmeter wheel permitting light to pass through the light path in a series of pulses directly proportional to the rate of rotation of the flowmeter wheel.

Another object of this invention is to provide a flowmeter wherein the light pulses are electronically counted to provide an accurate indication of the quantity of beverage flowing through the tubing.

These and other objects and features of the present invention will become more fully apparent from the following description and appended claims taken in conjunction with the accompanying drawing.

BRIEF DESCRIPTION OF THE DRAWING

FIG. 4 is a plan view of the meter wheel in an intermediate stage of manufacture.

DETAILED DESCRIPTION OF THE PREFERRED EMBODIMENTS

Figure 1:
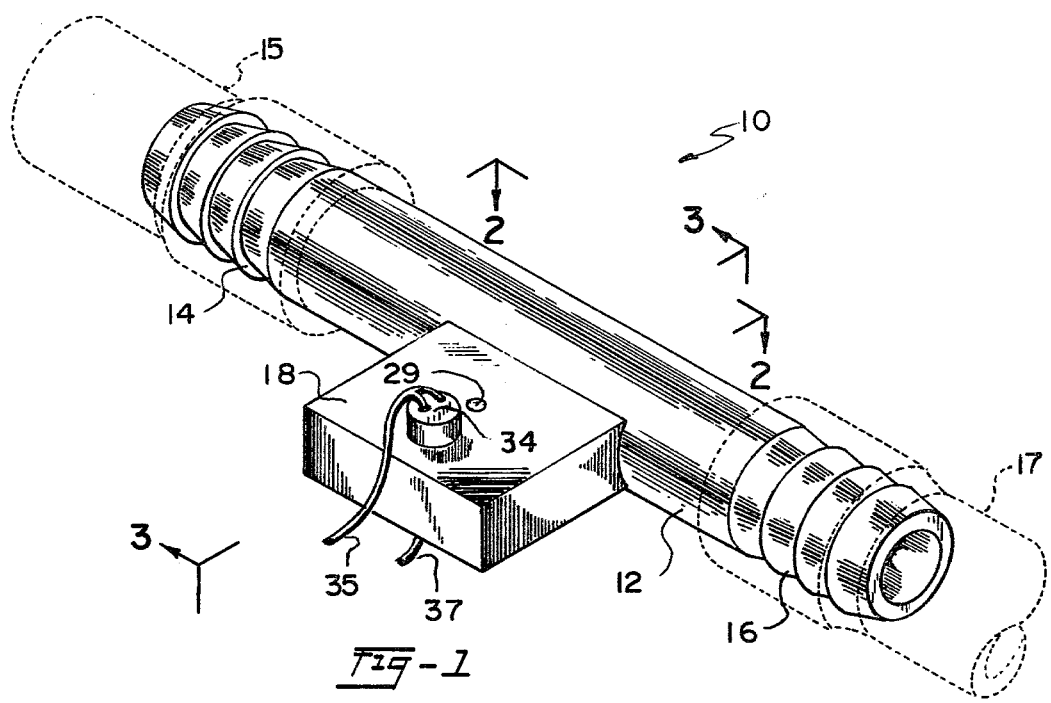
FIG. 1 is a perspective view of a presently preferred embodiment of the flowmeter apparatus of this invention shown in an environment of use as coupled with a beverage flow tubing, the tubing being shown in phantom lines.

The invention is best understood by reference to the drawing wherein like parts are designated with like numerals throughout.

Referring now more particularly to FIG. 1, the flowmeter apparatus of this invention is shown generally at 10 and includes a section of rigid conduit 12 having couplings 14 and 16 on each end thereof. Couplings 14 and 16 serve to releasably engage tubing ends 15 and 17 (shown in phantom line), respectively, thereby adapting flowmeter 10 for being selectively interposed in a beverage tubing. Couplings 14 and 16 are conventional couplings and may be of any suitable configuration for adapting flowmeter 10 for interposition into a beverage tubing.

Figure 2:
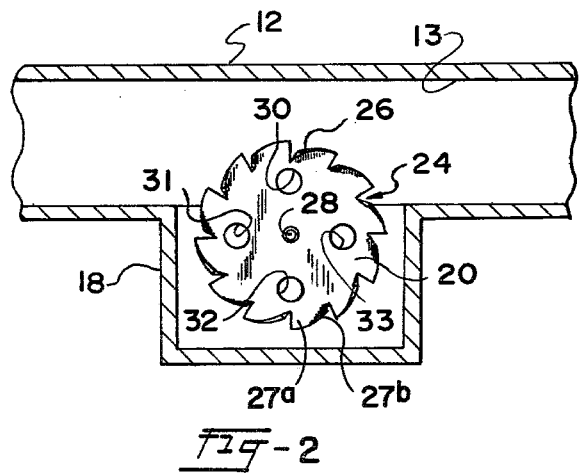
FIG. 2 is a cross section taken along lines 2—2 of FIG. 1.
Figure 3:
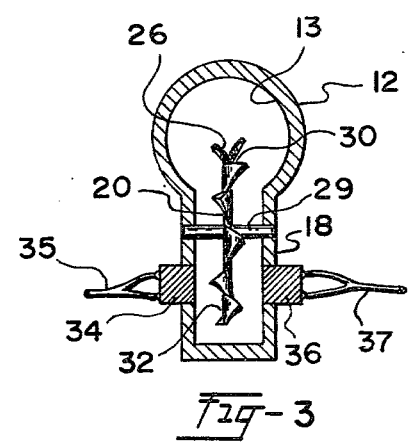

A housing 18 is configured as an integral part of conduit 12 and extends from a wall thereof. Housing 18 serves as an enclosure for a flowmeter wheel 20 (FIGS. 2 and 3) and as a support for a light source 34 and a photodetector 36 (FIG. 3). Housing 18 also serves as a support for an axle 29 for flowmeter wheel 20 (FIGS. 2 and 3). While shown herein as having a generally rectangular configuration, housing 18 could also be configurated with any other suitable profile so long as it suitably supports flowmeter wheel 20 (FIGS. 2 and 3) and light source 34 and photodetector 36 (FIG. 3).

Referring now to FIGS. 2 and 3, flowmeter wheel 20 is shown in its operative position as rotatably mounted on axle 29. Axle 29 is mounted in housing 18 so that a segment of flowmeter wheel 20 extends into lumen 13 of conduit 12. Flowmeter wheel 20 includes a plurality of apertures 30–33 therethrough, the apertures forming or otherwise completing a light path between light source 34 and photodetector 36. The spaces between each of apertures 30–33 block the light when flowmeter wheel 20 is appropriately positioned. Continued rotation of flowmeter wheel 20 presents the next succeeding aperture between light source 34 and photodetector 36 thereby again completing the light path.

Rotation of flowmeter wheel 20 is accomplished by a fluid beverage (not shown) flowing through lumen 13, the flow thereof suitably rotating flowmeter wheel 20. In particular, flowmeter wheel 20 is configured with a plurality beverage engagement means on the periphery thereof in the form of a plurality of segments 26. Segments 26 are formed between adjacent radial slits 24, segments 26 being twisted out of the plane of flowmeter wheel 20 thereby providing the necessary beverage engagement means. For example, in one presently preferred embodiment of this invention, flowmeter wheel 20 is fabricated from a planar, rigid piece of brass having a diameter of 0.495 inches. Slits 24 are cut radially to a length of 0.050 inches to form segments 26 therebetween. Segments 26 are thereafter twisted 20° from the plane of flowmeter wheel 20. Advantageously, the technique of fabrication for the flowmeter wheel 20 of this invention provides a very inexpensive flowmeter wheel, and, correspondingly, flowmeter 10.

Figure 4:
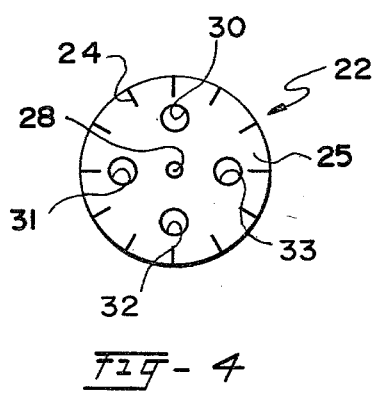
FIG. 4 is a cross section taken along lines 3—3 of FIG. 1.

Referring now more particularly to FIG. 4, an intermediate stage of fabrication of flowmeter wheel 20 (FIGS. 2 and 3) is shown herein as wheel blank 22. Wheel blank 22 is stamped as a circular element from a suitable, rigid material such as brass, plastic, or the like. The appropriate food grade characteristics since flowmeter 10 (FIG. 1) is specifically adapted for use in measuring beverage flow quantity and/or rate. Wheel blank 22 includes a center aperture 28 for receipt of axle 29 (FIGS. 1 and 3) and a plurality of light apertures 30–33. As shown, a plurality of radial slits 24 are cut into wheel blank 22 thereby forming a series of planar, circumferentially arrayed segments 25. Segments 25 are thereafter twisted outwardly from the plane of wheel blank 22 to form the appropriate beverage flow engagement means 26 (FIGS. 2 and 3).

Referring again also to FIGS. 2 and 3, each of segments 25 is twisted such that a leading portion 27A of flow engagement segment 26 remains generally in the plane of flowmeter wheel 20 while the trailing edge 27b is twisted outwardly approximately 20° from the plane of flowmeter wheel 20. Each of segments 26 is serially twisted toward to the opposite side of flowmeter wheel 20 thereby providing a more uniform flow-engagement profile to the beverage. In this configuration, beverage (not shown) flowing through lumen 13 strikes the trailing edge 29 and pushes to rotate flowmeter wheel 20. Leading edge 27a presents a reduced profile permitting relatively uninhibited rotation of flowmeter wheel 20 so that rotation more closely corresponds to the rate of flow of beverage (not shown) through lumen 13. In one presently preferred embodiment of the present invention, one fluid ounce flowing through lumen 13 will cause flowmeter wheel 20 to rotate causing apertures 30–33 to intermittently complete the light path between light source 34 and photodetector 36 sixty-four times. The flowing of one fluid ounce of beverage will be interpreted as 64 light pulses that will be accumulatively processed to provide an indication of beverage flow. Furthermore, since the liquid beverage is basically incompressible, a predetermined volume of liquid will move a given linear distance through a lumen 13 having a constant section. The revolutions of the wheel are then electronically counted, amplified, digitally processed and electronically displayed as ounces of fluid flow. Careful preselection of the flowmeter wheel 20 can thus be made so that flowmeter wheel 20 will turn a given number of times for a given volume of liquid flowing through lumen 13. Importantly, the relationship between the volume of liquid flowing through lumen 13 and the revolutions of flowmeter wheel 20 remains relatively constant regardless of the rate of flow so long as the amount of beverage is sufficient to keep lumen 13 full of beverage.

Figure 5:
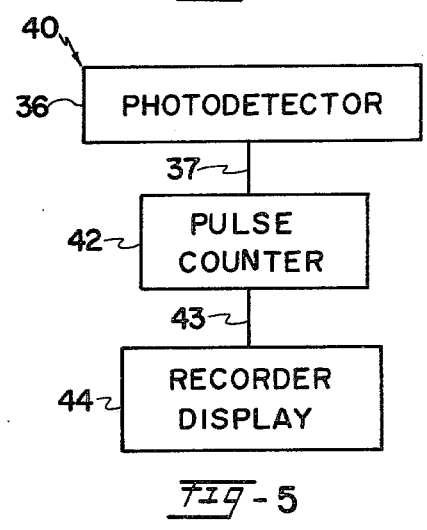
FIG. 5 is a schematic illustration of the electronic system for the flowmeter apparatus of this invention.

Referring now more particularly to FIG. 5, a schematic illustration of the electronic system of this invention is shown herein generally at 40 and includes photodetector 36, a pulse counter 42 and a recorder/display 44. Photodetector 36 (see also FIG. 3) and is suitably interconnected with a pulse counter 42 by lead 37 and pulse counter 42 is electrically connected to a recorder/display 44 by electrical lead 43. Photodetector 36 initiates an electronic signal upon light from light detector 34 (FIGS. 1 and 2) passing through any one of apertures 30–33 (FIGS. 2 and 4) when flowmeter wheel 20 (FIGS. 2 and 3) is suitably rotated by the flow of beverage through lumen 13 (FIGS. 2 and 3). Each passage of light through the light path as set forth hereinbefore produces the appropriate electronic signal which traverses electrical lead 37 and is counted by pulse counter 42. Importantly, flowmeter 10 (FIG. 1) is suitably calibrated so that the number of pulses counted by pulse counter 42 is appropriately coordinated with the volume of beverage passing through flowmeter 10 (FIG. 1). Any appropriate pulse count per volume of liquid dispensed could be obtained by the appropriate coordination of flowmeter wheel 20 with the size of lumen 13 and the displacement of apertures 30–33 (FIGS. 2–4). In any event, once calibrated, the flowmeter 10 (FIG. 1) suitably and accurately indicates the volume of beverage passing through flowmeter 10.

Recorder/display 44 may be selectively configured to provide either a continuous readout of the volume dispensed and/or may be incorporated with a recorder device to provide a continuous recording of the amount of beverage dispensed. Additionally, an appropriate strip chart arrangement may be provided and coupled with a timing device to provide a continuous readout of beverage dispensed as a function of time and also as a function of the time of day. Clearly, numerous additional, commercially available configurations and/or features may be incorporated as a part of recorder/display 44.

Advantageously, each of light source 34, photodetector 36, pulse counter 42, and recorder/display 44 are conventional electronic equipment well-known in the art and may be suitably modified for the apparatus and method of this invention. For example, one representative example of optoelectronic components may be found in a publication entitled "General Electric Optoelectronics Manual" by W. H. Sahm, Semiconductor Products Department, General Electric Company, pages 8–11.

The Method

In practicing the method of the present invention, the size and configuration of flowmeter wheel 20 is suitably coordinated with the size of lumen 13 so as to provide a given number of revolutions of flowmeter wheel 20 for a given volume of beverage passing through lumen 13. Since flowmeter 10 is specifically configured to be interposed in a beverage tubing such as encountered in the dispensing of beer and the like. For example, tube diameters having an internal diameter of 0.1875 inches are conventional. These tubes are generally fabricated from a suitable, flexible and food grade plastic material. Accordingly, the tubing may be suitably cut providing ends 15 and 17 which may then be coupled to couplings 14 and 16, respectively. Thereafter, a suitable electrical power source may be provided through lead 35 to light source 34 and photodetector 36 may be suitably coupled to pulse counter 42 through electrical lead 37.

When used to measure beverage flow rate, the light pulses are counted as a function of time. The measurement of quantity only involves counting the number of light pulses since the apparatus of this invention can be selectively fabricated so that each light pulse represents a given volume of beverage through the flowmeter.

The invention may be embodied in other specific forms without departing from its spirit or essential characteristics. The described embodiments are to be considered in all respects only as illustrative and not restrictive and the scope of the invention is, therefore, indicated by the appended claims rather than by the foregoing description. All changes that come within the meaning and range of equivalency of the claims are to be embraced within their scope.

What is claimed and desired to be secured by a United States Letters Patent is:

1. A flowmeter comprising:
   a conduit;
   a housing formed as a protrusion on the side of the conduit;
   rotatable member means housed in the housing, the housing thereby forming an enclosure in fluid communication with the interior of the conduit to accommodate the rotatable member means extending into the conduit, the rotatable member means comprising a circular, planar wheel member having fluid engagement means disposed around the periphery of the wheel, the fluid engagement means comprising a plurality of offset elements formed in the periphery of the wheel, the offset elements comprising segments of the wheel periphery alternately twisted outwardly from the plane of the wheel, thereby forming said fluid engagement means;
   a plurality of apertures in the rotatable member means, the apertures being uniformly spaced around the axis of the rotatable member means;
   light path means through the apertures when the apertures are at a predetermined position between a light source and a light detector means; and
   counter means for counting the number of times the apertures cross the light path means allowing light to be detected by the light detector means.

2. The flowmeter defined in claim 1 wherein the conduit further comprises an incremental length of tubing with coupling means at each end for coupling the flowmeter with a fluid conduit thereby interposing the flowmeter in the fluid conduit.

3. The flowmeter defined in claim 1 wherein the light path means comprises a light emitting diode means as the light source and a photodetector means as the light detector means.

4. A beverage flowmeter for measuring a beverage dispensed through a relatively small diameter tubing comprising:
   a discrete length of conduit;
   a rotatable wheel extending into the conduit, the wheel having a plurality of beverage engagement means around the periphery to thereby accommodate rotation of the wheel upon flow of beverage through the conduit, the rotatable wheel being fabricated as a circular, planar element and having a plurality of radial slits around the circumference, the slits forming discrete segments, the discrete segments being alternately twisted from the plane of the wheel to form the beverage engagement means;
   a plurality of apertures circumferentially and uniformly arrayed between the axis of the wheel and the beverage engagement means;
   a light source on one side of the wheel and located to transmit light through the apertures;
   a light detector on the other side of the wheel to detect light transmitted through the apertures; and
   counter means for counting the number of times light is detected by the light detector as the wheel rotates and the apertures pass between the light source and the light detector, the counter means thereby providing an indication of the quantity of beverage flow through the conduit, 5. The beverage flowmeter defined in claim 4 wherein the rotatable wheel is enclosed by a housing, the housing extending from the side of the conduit and serving as a support for the wheel, the light source, and the light detector.

6. A method for measuring a beverage dispensed through a tubing comprising:
   preparing a flow-actuated meter wheel by forming a plurality of beverage engagement means in the periphery of the wheel by cutting a plurality of radial cuts in the periphery of the meter wheel thereby forming discrete segments and twisting the segments out of the plane of the meter wheel creating said beverage engagement means;
   forming a plurality of uniformly spaced apertures in the wheel at a preselected radius from the axis of the wheel;
   transmitting light through the apertures by mounting a light source adjacent one side of the wheel at a position to transmit light through each aperture as said aperture is moved past said light source upon rotation of the wheel about the axis;
   detecting the light transmitted through the apertures by mounting a light detector on the other side of the wheel;
   inserting an edge of the wheel in a conduit;
   interposing the conduit in the tubing; and
   counting the number of times the light is detected by the light detector thereby providing an indication of the quantity of beverage dispensed through the tubing.

7. The method defined in claim 6 further comprising enclosing the meter wheel in a housing extending from a wall of the conduit, the housing supporting the light source and the light detector and rotatably supporting the meter wheel.

8. The method defined in claim 6 wherein the interposing step further comprises forming connectors at each end of the conduit to accommodate coupling the conduit to the tubing.

* * * * *